United States Patent [19]

Richardson et al.

[11] Patent Number: 5,459,458

[45] Date of Patent: Oct. 17, 1995

[54] VIRTUAL PAGER FOR GENERAL PURPOSE DATA TERMINAL

[75] Inventors: C. Patrick Richardson; Susan B. Major, both of Barrington; G. Michael Milikich, Grayslake; James E. Mathis, Barrington; Mark J. Johnson, Algonquin; Stephen J. Van Rooy, Kildeer, all of Ill.

[73] Assignee: Motorola, Inc., Schaumburg, Ill.

[21] Appl. No.: 394,046

[22] Filed: Feb. 24, 1995

Related U.S. Application Data

[63] Continuation of Ser. No. 86,065, Jul. 6, 1993, abandoned.

[51] Int. Cl.⁶ ............................................. G08B 5/22
[52] U.S. Cl. ................. 340/825.52; 340/825.44; 364/705.05
[58] Field of Search ................... 340/825.52, 825.44; 379/53, 58; 364/705.01, 705.05, 715.01

[56] References Cited

U.S. PATENT DOCUMENTS

| | | | |
|---|---|---|---|
| 4,481,670 | 11/1984 | Freeburg | 455/33 |
| 4,914,624 | 4/1990 | Dunthorn | 364/900 |
| 4,994,797 | 2/1991 | Breeden | 340/825.44 |
| 5,115,233 | 5/1992 | Zdunek et al. | 340/825.44 |
| 5,142,279 | 8/1992 | Jasinski et al. | 340/825.44 |
| 5,153,582 | 10/1992 | Davis | 340/825.44 |
| 5,189,632 | 2/1993 | Paajanen et al. | 364/705.05 |
| 5,251,250 | 10/1993 | Obata et al. | 340/825.44 |
| 5,327,486 | 7/1994 | Wolff et al. | 379/58 |

Primary Examiner—Donald J. Yusko
Assistant Examiner—Edward Merz
Attorney, Agent, or Firm—Val Jean F. Hillman

[57] ABSTRACT

A general-purpose data terminal (242), such as a personal computer, portable computer, notebook computer, personal intelligent communicator, portable wireless terminal and the like employs a radio frequency (RF) modem (408) and is programmed to function as a two-way acknowledge back pager. The general purpose data terminal (242) maintains a table listing (600) of caller identification information and presents this information to the device user upon receipt of a page (300) from an identifiable caller. The device user may respond to the page by selecting one of a plurality of user definable responses to be transmitted back to the caller. If no response is selected the caller will receive a message informing them of the paged party's unavailability.

12 Claims, 5 Drawing Sheets

| HOME PHONE No. | WORK PHONE No. | NAME | ADDRESS | MISC. |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

VIRTUAL PAGER FOR GENERAL PURPOSE DATA TERMINAL

This is a continuation of application Ser. No. 08/086,065, filed Jul. 6, 1993 and now abandoned.

TECHNICAL FIELD

This invention relates generally to radio communication systems. More particularly, the invention relates to a method for enabling a general-purpose data terminal, such as a personal computer, portable computer, personal intelligent communicator, portable wireless terminal and the like to operate as a pager.

BACKGROUND OF THE INVENTION

Communication systems which employ portable data terminals for providing data message communications over conventional radio frequency (RF) channels are becoming more and more common in the industry. Typically, such RF data communication systems comprise a base station with full duplex capability, a network control processor (NCP), front end to a system host computer, and a plurality of portable radio data terminals operating in half-duplex mode.

With the recent proliferation of personal computing and communications platforms which employ microcomputers, and the advent of increasingly smaller, yet reliable RF modems, it would be extremely advantageous to incorporate paging-type functionality within conventional data terminal devices such as, but not limited to portable computers, personal computers, personal intelligent communicators and the like. Such an incorporation will eliminate the need for multiple device platforms and will permit a single device to provide both paging and computing functionalities.

SUMMARY OF THE INVENTION

Briefly described, the present invention is a method and apparatus for enabling a general-purpose data terminal, such as a personal computer, portable computer, personal intelligent communicator, portable wireless terminal and the like to function as a two-way acknowledge back pager. In this effort, the general purpose data terminal includes method steps and apparatus structure for receiving a radio paging call comprising a caller generated variable length message, said message comprising a call-back number and/or message text, said general purpose data terminal comprises a radio receiver for receiving the caller generated variable length message; memory for storing a table of caller identification information, said information comprising at least a call-back number and catchwords; a processor, coupled to the radio receiver, for extracting the call-back number from the received message; said processor, coupled to memory for indexing the memory table as a function of the extracted call-back number; a display unit, coupled to memory, for displaying the received message and the indexed caller identification information; an input device, operative by the general purpose data terminal user, for designating a user selected response in response to the message display; and a radio transmitter, responsive to the user designation, for transmitting a signal acknowledging reception of said paging call, said acknowledge signal also being indicative of a response to the transmitted paging call.

DETAILED DESCRIPTION OF A PREFERRED EMBODIMENT

With reference to the present invention, there is provided a method and apparatus for supporting a paging-type functionality via general purpose computer terminals such as, but not limited to, radio data terminals, personal computers, portable computers, electronic notebooks, personal intelligent communicators, wireless data terminals and the like.

Figure 1:
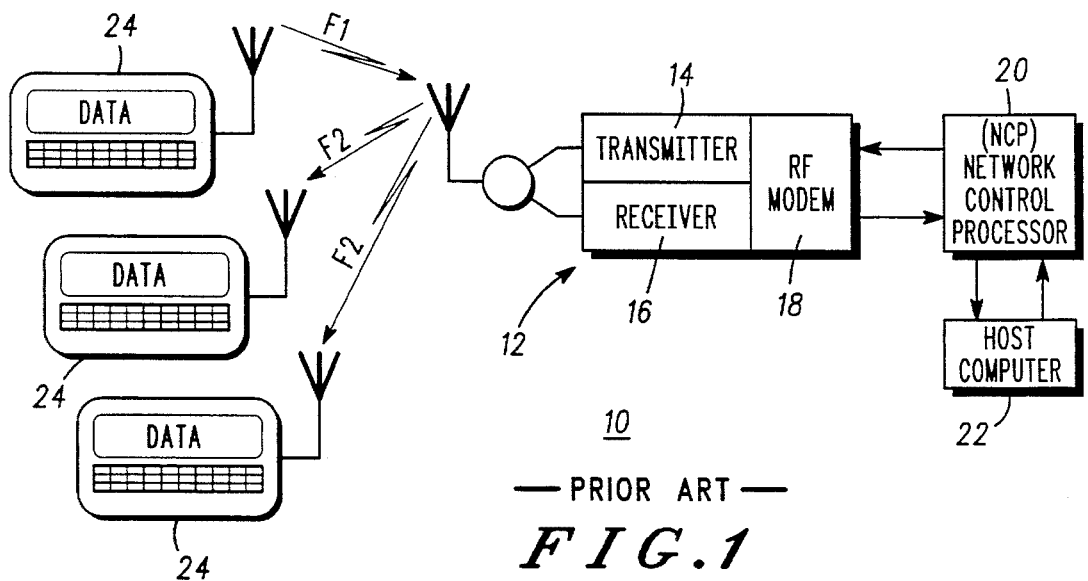
FIG. 1 is a block diagram of a conventional RF data only communication system which may be considered as known in the art.

Referring now to the drawings, a typical radio data only communication system 10, which may be considered as known in the art, is illustrated in block form in FIG. 1. The system has a centrally located base station 12, comprising transmitter 14 and receiver 16, operating in full duplex mode, which communicates with, by modem 18, and is controlled by, a network control processor (NCP) 20. NCP 20 in turn communicates with a host computer 22 as indicated. A plurality of radio data terminals 24 are also a part of the system 10, operating in half duplex mode to communicate with the base station 12 via a communications medium, such as an RF channel.

As will be appreciated, a second base station (not shown), coupled to NCP 20, may be included in the system 10, to provide redundancy for improved reliability when co-located with the base station 12, or it may be located away from the base station 12 in order to expand the coverage area to a larger geographic area.

The communication system equipment of FIG. 1 already exists and has in the past been available from Motorola Inc. Specifically, base station equipment 12 has in the past been available as Motorola model number MSF-5000 and NCP 20 has in the past been available under Motorola model number NCP-500 or model NCP-3000. Data terminals 24 are available from Motorola in a variety of models, including, but not limited to, model KDT-440, KDT-460 and KDT-840. These and the aforementioned Motorola models and corresponding instruction manuals may be obtained by contacting Motorola Inc. at 1303 E Algonquin Road, Schaumburg Ill. 60196.

Figure 2:
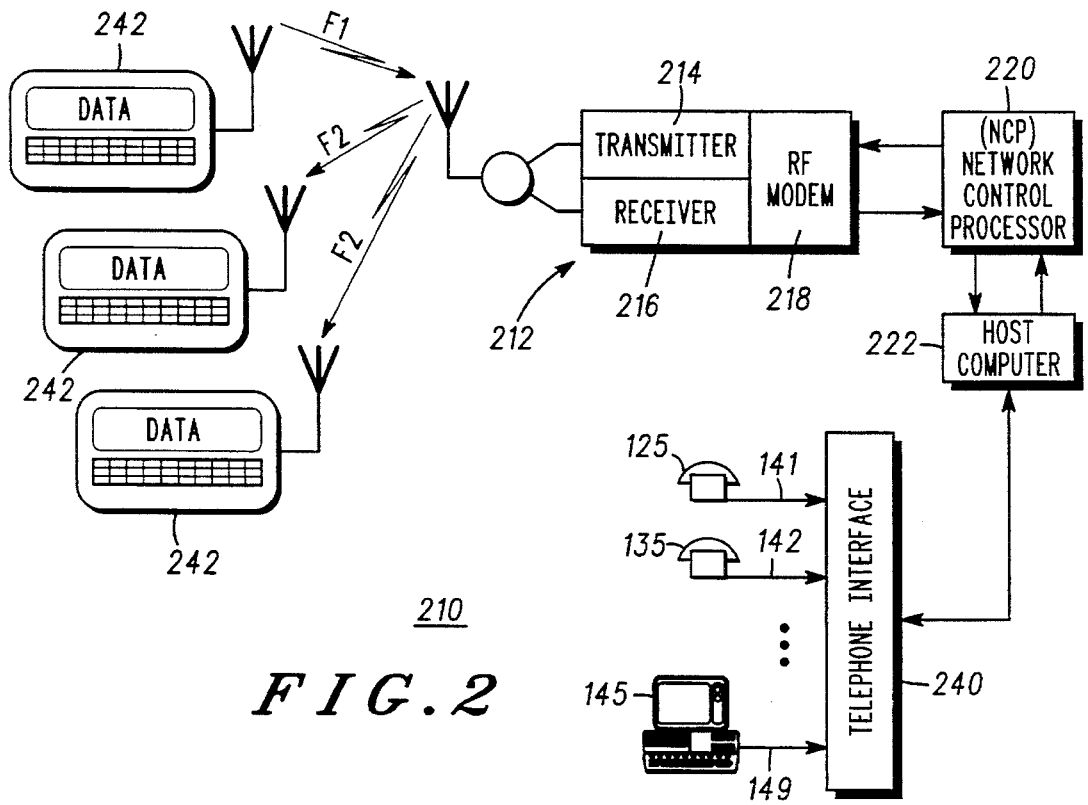
FIG. 2 is a block diagram of an RF data communication system which has been constructed in accordance with the present invention.

The data system of the present invention, which permits paging-type functionality between a page originator and general purpose data terminals, is set forth in FIG. 2, which system has been constructed in accordance with the precepts of the present invention. In broad terms, the system 210 of FIG. 2 is substantially similar to the system 10 described in association with FIG. 1 in that a centrally located base station 212 comprising a receiver 214 and transmitter 216 is provided. Modem 218 permits communication between base station 212 and NCP 220. NCP 220 in turn communicates with a host computer 222. A plurality of portable/mobile radio data terminals 242, hereinafter referred to as virtual pagers, are also integral to the system 210. In addition to the data terminals specifically mentioned above, it will be appreciated by those skilled in the art that any general purpose data terminal or computer device such as, but not limited to, personal computers, portable computers, electronic notebooks, electronic personal organizers, personal intelligent communicators and the like, in combination with a radio packet data modem such as a Motorola model F2070A may constitute a virtual pager 242. In the past, the above-mentioned radio packet data modem and corresponding instruction manuals have been available by contacting Motorola Inc. at 1303 E. Algonquin Road, Schaumburg Ill. 60196.

In the system 210 of FIG. 2, base station 212 is connected to a conventional telephone interface 240 of the type generally used for central paging terminals. Telephone interface 240 couples paging call source devices, such as telephones 125 and 135 and data terminal 145 (with modem and auto dialer), via outside telephone lines 141, 142 etc. to an input of host computer 222. Telephone interface 240 converts message signals from lines 141, 142, etc. to digital signals which host computer 222 can process.

By way of example, a caller wishing to send a numeric page to a virtual pager 242 user may use telephones 125 or 135 and dual tone multi-frequency (DTMF) signaling to key in a desired message. Upon receipt, telephone interface 240 converts the analog DTMF message signal into a digital representation which host computer 222 processes as described herein below in more detail. Optionally, a caller wishing to send an alphanumeric messages to a virtual pager user may use data terminal 145 to key in the desired message for communication to telephone interface 240 via telephone line 149 and a modem in a manner well known in the art. Upon receipt, telephone interface 240 again converts the analog message signal into a digital representation which host computer 222 processes prior to transmission.

The host computer 222 may further include a keyboard coupled to a data input port (not shown). Such a keyboard permits an operator to directly input numeric or alphanumeric messages into host computer 222 for transmission to virtual pagers within the general population via NCP 220 modem 218 and transmitter 214. As will be appreciated, other forms of messages, such as, but not limited to, digitized voice messages, may also be processed and transmitted from base station 212 as well. Digitizing and transmitting voice messages is well known in the art.

Figure 3:
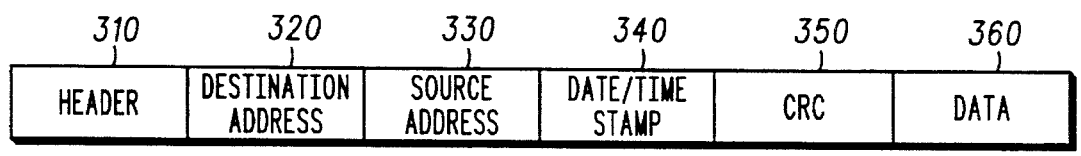
FIG. 3 is a representation of the message format utilized by the base station and the remote terminals of FIG. 2 during inbound and outbound communications.

Although the above system has been described in terms of the arrangement depicted in FIG. 2, it will be appreciated by those skilled in the art that system 210 may optionally be configured to that shown in FIG. 3 of issued U.S. Pat. No. 5,115,233, as assigned to the assignee of the present application, if and when the addition of voice communications is desired.

According to the present invention, each virtual pager is given a unique subscriber unit identification number by which it is identified. In addition, each virtual pager contains a user definable list for maintaining caller identification information to be stored within a table in virtual pager memory. This list typically comprises the names, addresses, phone numbers and other relevant identification information pertaining to page originators who frequently page the virtual pager user. In order to set up the system of the present invention, each virtual pager user selects and enters a set of caller specific identification information into the list of a table like the one depicted in FIG. 6.

The operation of the system is as follows. A page originator places a paging call via one of input devices 125, 135, 145 etc., by entering the appropriate commands to the host computer 222 or by lifting the handset of the telephone 125 or 135 and dialing a predetermined number assigned to the base station 210. The telephone interface 240 routes the call to the base station 212. Upon receipt, host computer 222 issues a prompt message (e.g. a digitized voice prompt in the case of a telephone input device) prompting the page originator to enter an identification number for the virtual pager 242 to be paged. After entry of this number (e.g. via DTMF touch pad in the case of telephones 125 and 135), the host computer 222 issues a further prompt, prompting the page originator to enter a call-back number and/or any additional message. Typically, the page originator enters his call-back number in the same manner. Upon receipt of the virtual pager ID, call-back number and the associated message, the host computer directs the base station 212 to transmit a page message to the virtual pager population.

Upon receipt by the virtual pager 242 population, the message must first be identified as a virtual page. The manner in which this identification process is performed by a virtual pager will be described below with reference to FIGS. 3 and 4. After the page message has been identified as a virtual page, the specific virtual pager for which the page message is intended must so recognize the page message. This is accomplished by a comparison between the virtual pager ID included in the page message and the unique special interest destination number stored in virtual pager memory and by which each virtual pager may be identified.

Upon receipt and verification, the destination virtual pager proceeds to process the received virtual page by comparing the call-back number against the list of called specific identification information previously stored in memory, and determines whether a match exists with one of these user entered entries. If a match exists, the virtual pager will retrieve all relevant identification information associated therewith from memory and display the retrieved information, along with the call-back number and any additional message as transmitted within the virtual page message. If no match is identified, the virtual pager will display the call-back number and message and identify them as being transmitted from an unknown source.

Assuming the virtual page message fails to comprise a call-back-number, text matching, as is known in the art, may be employed to access information relevant to the page originator, as stored in the user generated list of caller specific identification information. By way of example, and not by way of limitation, various catchwords within the message text portion of a virtual page message may be compared against those entries comprising the user generated list. Such catchwords may include, but are not limited to first names, surnames, business names, addresses and interpersonal relationships (e.g., husband, wife, son, daughter).

If a match exists, the virtual pager will retrieve all relevant identification information associated therewith from memory and display the retrieved information, along with the message text portion of the virtual page message. If no match is identified, the virtual pager will display the message text and identify it as being transmitted from an unknown source.

The base station 212 transmits virtual pages to the virtual pager 242 population by generating and transmitting a virtual page message signal (F2) shown in FIG. 2. In response to the receipt of a virtual page, a virtual pager 242 may respond to the page originator by generating and transmitting a reverse page message signal (F1) as shown in FIG. 2. In accordance, FIG. 3 is a representation of the packet data message format utilized by the base station and the virtual pagers of FIG. 2 during inbound and outbound communications. Referring to FIG. 3 it can be seen that each virtual page and reverse page comprises at least a header field 310, destination address field 320, source address field 330, date/time field 340, cyclic redundancy check field 350 and data field 360.

The header field 310 is a radio header as is known in the art and is therefore typically used to facilitate radio synchronization. In the outbound direction the destination address fields 320 maintains the unique address for the virtual pager intended to receive the virtual page message signal (F2). As will be described, the page originator must provide this information during virtual page message creation. In the inbound direction, however, the destination address fields 320 will contain the address for the base station 212 intended to receive the reverse page message signal (F1) transmitted by a a virtual pager 242. Typically, this will be the base station that transmitted the virtual page. Where roaming is permitted, such as in a cellular communication system, it may be necessary to route the inbound message via another base station as is known in the art.

In the outbound direction the source address fields 330 will contain the address of the base station that transmitted the virtual page message signal (F2). In the inbound direction, however, the source address field 330 will contain the address of the virtual pager 242 that transmitted the reverse page message signal (F1). This convention permits an awaiting base station to identify reverse pages which correspond to a previously transmitted virtual page.

Time/Date field 340 contains indicia of the year, month, day, hour and minute that the radio data packet of FIG. 3 is transmitted. This time stamp information assists the base station 212 in determining if and when to play a time out message to a page originator awaiting a potential response. Cyclic redundancy check field 350 is provided for error detection and correction. Finally, Data field 360 comprises the message text portion of the variable length message as entered by the page originator.

In accordance with the present invention the first character of the data field 360 is used to distinguish virtual and reverse pages from other message types. In accordance with the preferred embodiment, when the first character of the message field 360 is an asterisks (*), the message is a either a virtual or a reverse page. In a similar fashion, weighting the most significant bit of data field 360 may also be employed to identify virtual and reverse page messages.

Figure 4:
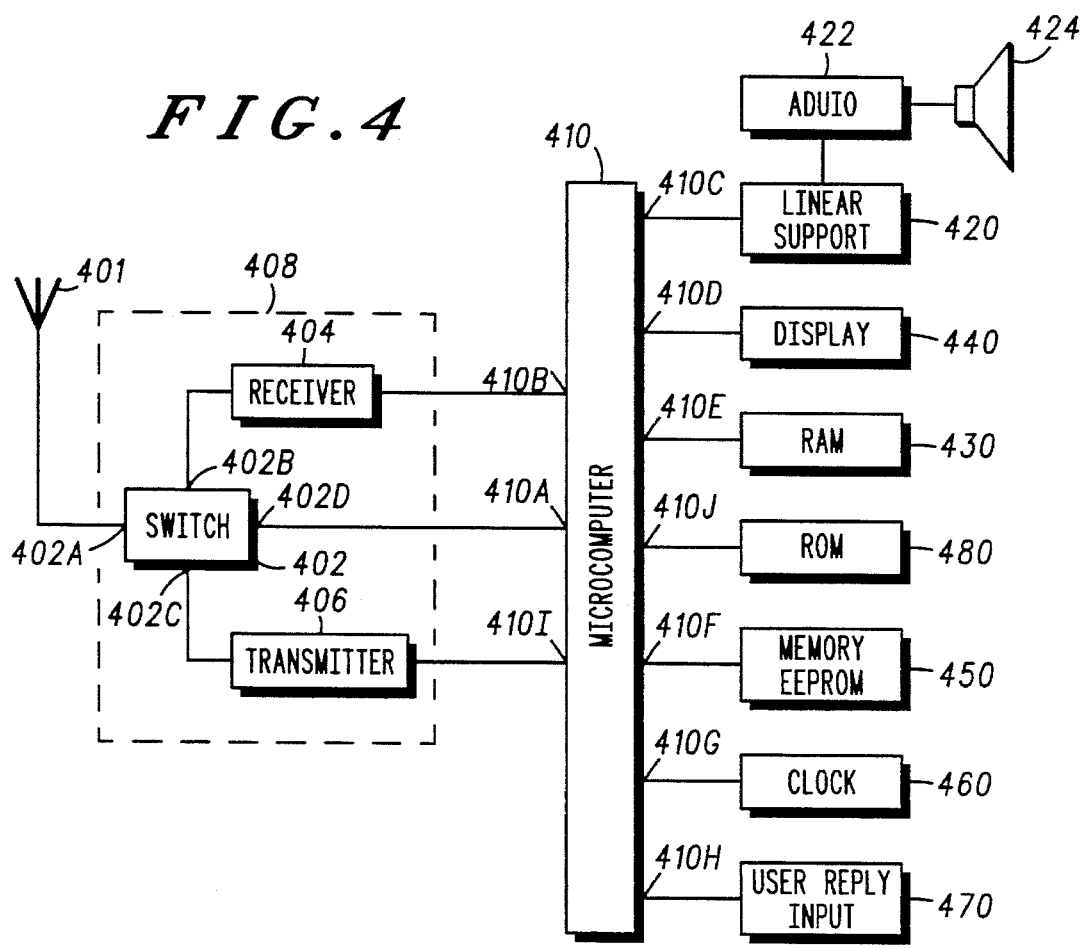
FIG. 4 is a block diagram embodiment of a virtual pager in accordance with the present invention.

FIG. 4 is a block diagram of one embodiment of a virtual pager 242 of FIG. 2. In one embodiment of the invention, virtual pagers 242 transmit reverse page command signals on the same radio frequency as that on which base station 212 transmits although this is not necessarily a requirement of the system. That is, other embodiments of the invention are contemplated wherein the virtual pagers transmit reverse page command signals at frequencies other than within the spectrum of the virtual paging channel employed by base station 212 of FIG. 2. However, in the present invention, a radio packet data modem 408, such as a Motorola model F2070A is included within such virtual pagers to enable them to accurately tune to and transmit reverse page command signals at different sub-bands within the same paging channel spectrum as that employed by base station 212 of FIG. 2 for transmission of paging signals as is known in the art. In the past, such radio packet data modem 408 and corresponding instruction manuals has been available by contacting Motorola Inc. at 1303 E. Algonquin Road, Schaumburg Ill. 60196.

Each virtual pager may include such an RF modem as described herein. Such a device includes a transmit/receive antenna 401 exhibiting an appropriate size and geometry to permit transmission and reception of radio frequency signals on the radio frequency paging channel on which base station 212 transmits and receives. Antenna 401 is coupled to a common port 402A of a transmit receive switch 402. Transmit/receive switch 402 includes a receive port 402B and a transmit port 402C in addition to the above mentioned antenna input port 402A. Switch 402 includes a control input 402D as shown in FIG. 4. When an appropriate control input signal is supplied to control input 402D, transmit/receive switch 402 couples antenna port 402A to receive port 402B to place virtual pager 242 in the receive mode. Alternatively, virtual pager 242 is placed in the transmit mode when an appropriate control signal is supplied to control input 402D such that transmit receive switch 402 couples the antenna input port 402A to transmit port 402C. These control signals are supplied to control input 402D by microcomputer 410. One microprocessor which may be employed as microcomputer 410 is the model MCC1468705G2 manufactured by Motorola, Inc.

Receive port 402B of switch 402 is coupled to the input of a radio frequency receiver 404 as is known in the art. It is noted that the frequency of the virtual paging channel on which base station 212 transmits is defined to by $F_{RX}$, for example, 150 MHz. Thus, the radio frequency signals which reach virtual pager 242 and which are provided to receiver 404 exhibits a frequency of $F_{RX}$ or 150 MHz.

Receiver 404 operates to demodulate the RF signals provided thereto in order to separate the preamble, address, and message signals from the carrier wave on which they were transmitted by base station 212. The data signals thus resulting are provided to microcomputer input 410B as shown in FIG. 4. Such data signals include preamble, address, and message signals. Microcomputer 410 of virtual pager 242 decodes the address signals provided at data input 410B and compares the incoming decoded addresses with the predetermined unique address of such pager 242 which is stored in a code memory 450. Code memory 450 is typically an electronically erasable programmable read only memory (EEPROM) such that unique pager address codes are easily assigned and programmed into each virtual pager 242. As seen in FIG. 4, memory 450 is coupled via a bus to a memory port 410F of microcomputer 410. When microcomputer 410 determines that the address in a received virtual page message corresponds to the unique address of such virtual pager 242, then microcomputer 410 decodes the message. In this fashion, microcomputer 410 determines which virtual page messages are intended for virtual pager 242.

In a known fashion, microcomputer 410 generates appropriate output signals which are supplied via linear support module 420 to audio module 422 and speaker 424 to alert the device user that a message has been received. The selected message is either stored in a random access memory (RAM)

430 which is coupled via a bus to microcomputer memory port 410E or displayed to the device user via display unit 440.

Figures 6, 7:
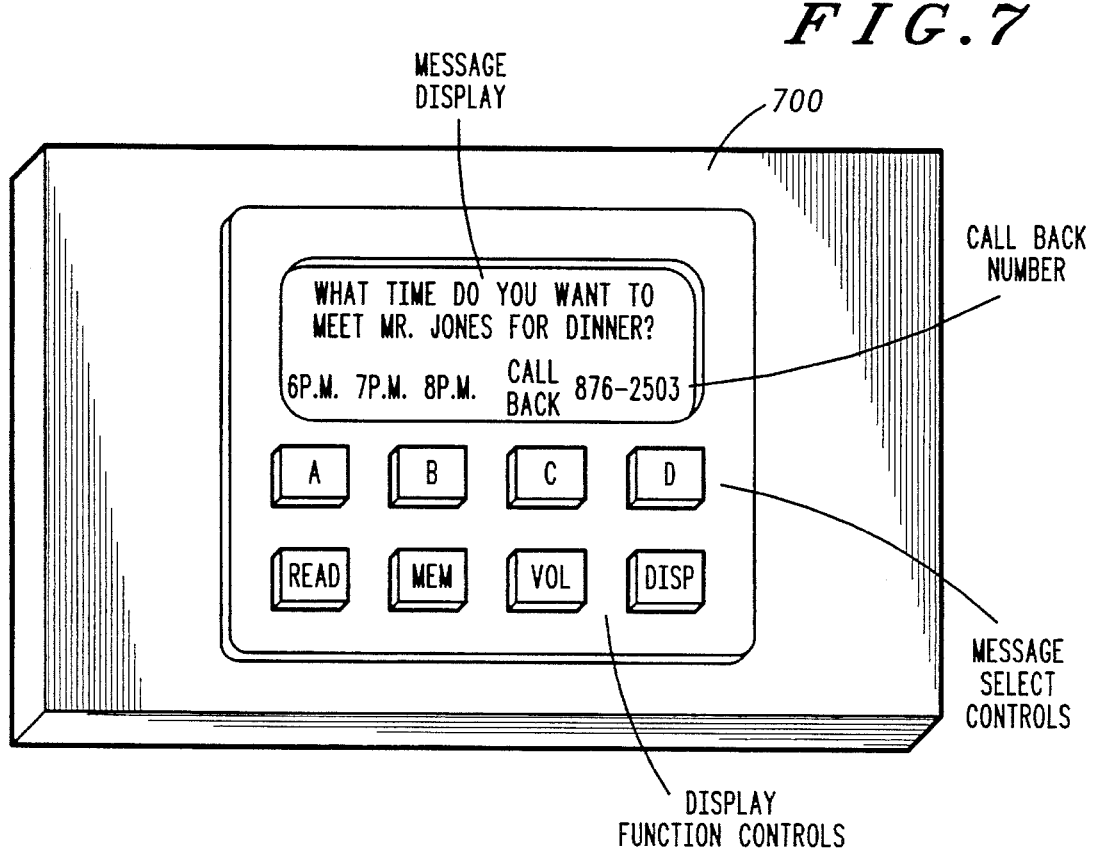
FIG. 6. is a caller ID look-up table employed by the virtual pager of the present invention.
FIG. 7 is an exemplary view of a graphic user interface of the type visually presented to a virtual pager user during the display of a virtual page message.

In accordance with the preferred embodiment, display unit 440, comprising a display device 700 as shown in FIG. 7, is coupled to the display output 410D of microcomputer 410 such that the selected message received by pager 242 can be displayed for viewing by the pager user. Such display operation can be made automatic, upon receipt of the virtual page message, or in the alternative, the device user can determine if and when to recall the virtual page page message from memory 430 for viewing at a more convenient time. Display unit 440 display devices are selectable from any of the well known visual display units comprising cathode ray tube (CRT) monitors, television monitors, liquid crystal display (LCD) modules, and light emitting diode (LED) displays. In accordance with the preferred embodiment, the display device of display unit 440 is a CRT monitor. A clock circuit 460 is coupled to a clock input 410G of microcomputer 410. Clock 460 provides microcomputer 410 with a reference time base. Read only memory (ROM) 480 is coupled to memory port 410J of microcomputer 410. As will be appreciated ROM 480 maintains a program instruction set which directs and controls the operation of microcomputer 410 and the various devices connected thereto.

A user reply input device 470 is coupled to a data input port 410H of microcomputer 410 as shown in FIG. 4. In accordance with the preferred embodiment, the user reply input device 470 comprises a touch screen controller and a transparent touch screen display which overlies the CRT display screen 700 of display unit 440. As will be appreciated, the touch screen display senses touch and un-touch actions performed by the device user. The touch screen display is connected electrically to the controller of the user reply input device 470 which in turn is coupled to data input port 410H of microcomputer 410 as shown in FIG. 4. In accordance with the preferred embodiment, the touch screen controller provides the drive voltages for the x and y axes of the touch screen, converts the analog input signals from the touch screen into digital coordinates for x and y and transmits these coordinates to the microcomputer 410. Such a touch screen and controller are described in U.S. Pat. No. 4,220,815.

It will be appreciated that the user reply input device 470 is not limited to the touch screen apparatus which was discussed above. Other input devices, such as, for example, a multi-position electromechanical switch, an alphanumeric keyboard, light and or pressure sensitive styli, voice activation schemes, graphic user interfaces, computerized information presentation systems or other key entry devices as are known in the art may be employed as user input device 470 in other embodiments of the invention to generate reverse page commands (reply data).

Reverse page commands are then transmitted back to base station 212 by virtual pager 242 using the protocol depicted in FIG. 3. In this effort, reverse page commands which includes indicia of a response provided by the device user at user reply input device 470 are output from microcomputer 410 at reverse page port 410I. The output of the reverse page port 410I is coupled to the input of transmitter 406 which amplifies and modulates the received signals prior to transmission. The output of transmitter 406 is in turn coupled to input 402C of transmit/receive switch 402 which couples the transmitter output to antenna 401 via common port 402A for communication back to base station 212.

Figure 5:
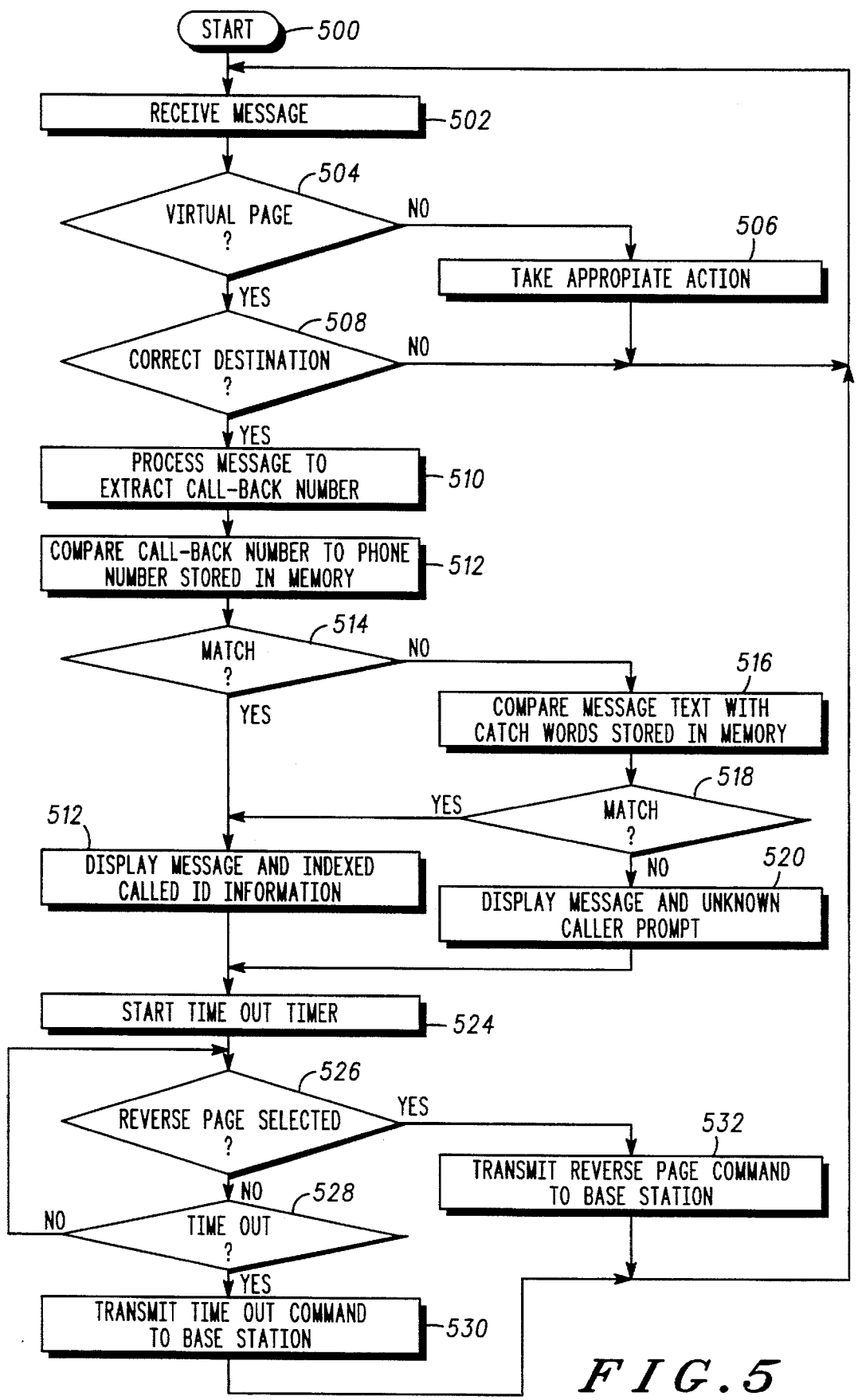
FIG. 5 is a flow chart depicting the operation of a virtual pager in accordance with the present invention.

Referring next to FIG. 5, a flow chart diagram of the control program, resident within virtual pager memory, for controlling the operation of each virtual pager 242 and further providing pager-like functionality within the communication system 210 of FIG. 2 is provided. The flow chart of FIG. 5 summarizes the steps performed by microcomputer 480 of virtual pager 242 upon receipt of a virtual page as described in association with FIG. 3.

Commencing at start block 500, flow proceeds to block 502 where a virtual pager 242 receives an RF message. Flow proceeds to decision block 504 where a check is performed to determine whether the received message is a virtual page (F1). As previously discussed, virtual pages are readily distinguishable from other types of messaging structures based upon the unique message format described in association with FIG. 3. In addition, the first character of the data field 360 of FIG. 3 is checked for the presence or absence of an asterisks (*). The presence of an asterisks in the first character field of data field 360 of FIG. 3, in conjunction with the message format of FIG. 3, identifies the transmission as a virtual or reverse page in accordance with the present invention.

Assuming a received message does not conform to the virtual page message format, flow proceeds to block 506 where other appropriate action is taken regarding processing of the non-virtual page message. From block 506, flow branches back to block 502 where the virtual pager 242 continue to monitor for the receipt of a next incoming message.

Assuming the received message is a virtual page message, flow proceeds from block 504 to block 508 where the virtual page message is processed by each virtual pager 242 within the virtual pager population to determine which specific virtual pager is intended to receive the message. As previously mentioned, each virtual pager is programmed with a unique identification number. A corresponding number which identifies the destination virtual pager is entered into the destination address field 320 of each virtual page message of FIG. 3 during the message generation process performed by the page originator and host computer 222. In this manner, each virtual pager can readily determine whether or not the received virtual page is intended for it.

Assuming the virtual page is not intended for the virtual pager in question, flow branches back to block 502 where the virtual pager 242 continue to monitor for the receipt of a next incoming message. If, on the other hand, the virtual page is intended for the virtual pager in question, flow proceeds to block 510 where the virtual pager processes the received message to extract the call-back number, as entered by the page originator.

When the virtual page comprises a numeric message only the message will typically comprise a call-back number at which the caller can be reached. When the message comprises alphanumeric characters it will typically comprise a call-back number in addition to the textual information the caller wishes to convey. In accordance with the present invention, the call-back number of each virtual page message is compared to the telephone numbers entered by the virtual pager user pursuant to the creation of the list of caller specific identification information as depicted in FIG. 6. The table comprising the list of phone number will typically contain additional caller identification information associatable with the call-back number such as, but not limited to: the caller's name; address; home, office, fax, and cellular telephone numbers; as well as other pertinent information which may assist the virtual page user determine the identity of the page originator, such as the caller's relationship to the virtual page user, whether it by familial, business, personal or other. Of note, the virtual page user is responsible for generating the information which is entered into the caller identification table.

At block 514 a check is performed by virtual pager 242 (i.e., microcomputer 410 of virtual pager 242) to determine whether the call-back number within the virtual page message matches any of the numbers stored in a caller identification table of FIG. 6, as stored in virtual pager memory. If no match is found at block 514, flow branches to block 516 where certain catchwords as found in the virtual page message text may be utilized to identify the page originator when a call-back number is absent or no match is found.

Catchword determinations are made by the device user pursuant to creation of the list of caller specific identification information. In accordance with the preferred embodiment, catchwords include, but are not limited to surnames, first names, business names and addresses for those individuals who frequently page the virtual pager user. Such catchwords are programmed into virtual pager memory during the creation of the list and are thereafter identifiable within a received virtual page by text matching as known in the art. Thus, at block 516, the virtual pager conducts a page matching operation to compare the words in the message text portion of the received virtual page and each of the catchwords within the list of caller specific identification information.

Assuming no match is found pursuant to the check performed at block 518, flow proceeds to block 520 where the virtual page message text and an "unknown source" prompt are displayed to the virtual pager user via visual display device 700 of FIG. 7. When either a call-back number match at block 514 or a catchword match at block 518 are determined, flow proceeds to block 522 where the virtual page message message along with the caller identification information stored in the caller identification table of FIG. 6 are displayed to the virtual device user.

From the displayed message, the basic nature of the virtual page may be determined. Such basic nature typically consists of whether the page requires action from the recipient or merely contains information. In order to permit the virtual pager user to determine the basic nature of the page and also to provide a response time assuming a response is forthcoming, a time out timer is started at block 524 in response to either display steps 520 or 522.

With reference to FIG. 7 a representative view of the display visually presented to a virtual pager user during the display of paging message information at block 520 and 522 is provided in accordance with the present invention. As will be appreciated, FIG. 7 is a graphical user interface (GUI) representation of a pager device. This GUI is displayed to the device user upon display device 700 which is integral to virtual pager 242. Such a display device is selectable from any of the well known visual display devices comprising cathode ray tube (CRT) monitors, television monitors, liquid crystal display (LCD) modules, and light emitting diode (LED) displays. In accordance with the preferred embodiment, the display device 700 is a CRT monitor.

By way of example, and not by way of limitation, the GUI display comprises a message display section, a plurality of message select control switches A, B, C, and D and a plurality of display function control switches designated READ, MEMORY, VOLUME, and DISPLAY. The message display section provides a visual representation of the virtual page message. It typically comprises the call-back number of the page originator, as well as an alphanumeric representation of the virtual page message as shown in FIG. 7. In addition, the information as stored by the virtual pager user in the list of caller specific identification information will also appear in the message display section. The message select switches A, B, C and D permit the device user to issue reverse pages in response to the virtual page as displayed. The function control switches permit the device user to control various aspects of the virtual pager's operation.

The typical virtual pager, such as a personal computer, portable computer, notebook computer, or personal intelligent communicator typically comprises a user reply input device. Such devices comprise, but are not limited to keyboards, touch screen displays, pressure or light sensitive styli, switches, voice activation schemes or any other input device that may be manipulated by the message recipient to select a response. In accordance with the preferred embodiment, the reply input device of the present invention utilizes touch screen and/or touch sensitive technology in association with the GUI of FIG. 7.

By way of example, and not by way of limitation, upon receipt and display of a virtual page message at block 520 or 522, choice A may be selected when the virtual pager user touches the touch screen in the proximity of the virtual button designated A. In the alternative, an un-touch action, as sensed by the touch screen, may be required to perform the appropriate selection. By prearrangement, choice A is selected by the pager user when he desires a "Yes" response to the caller's message. Choice B could be a "No" response. Choice C is a "Maybe" response and Choice D is a "Cannot Reply Now" response. It will be appreciated by those skilled in the art that replies other than those listed may be made available by message select switches like those depicted in FIG. 7. Such options include, but are not limited to: Who are you?; Call back later; Will call you back later; Call me at home; and On my way. Such options may be user definable, thereby permitting the device user to customize the available responses.

In accordance with well known touch screen technology, the selection of virtual switch A, B, C or D is converted to a digital signal which is supplied to microcomputer 410 of virtual pager 242 in order to generate a reverse page command (reply data). The reverse page command is then transmitted back to base station 212 by virtual pager 242 utilizing the message format of FIG. 3.

Manipulation of the control switches permits the device user to store and format a received virtual page for subsequent display. In this effort, the READ function control switch provides a signal to the data processing resource of virtual pager 242 to retrieve a virtual page as stored in memory and supply it to the display device of FIG. 7. The MEMORY function control switch provides a signal to microcomputer 410 of virtual pager 242 to store the next message received in memory of virtual pager 242. The VOLUME function control switch provides a signal to microcomputer 410 of virtual pager 242 to change the volume, in a prescribed direction, of any acoustic signalling device that may be coupled to the to microcomputer 410 of virtual pager 242 in addition to the display unit 440 of FIG. 4. Finally, the function control switch labelled DISPLAY provides a signal to microcomputer 410 of virtual pager 242 to cause a previously stored virtual page to be retrieved from memory and displayed via the display unit of 440 of FIG. 4.

Referring back to FIG. 5, flow proceeds from block 520 and 522 to blocks 524 through 528 where a check is performed to determine whether, within a predetermined time out period, the virtual pager user has selected one of the possible reverse page options (message select switches A, B, C or D of FIG. 7) in response to the message as displayed at blocks 520 or 522. Assuming the virtual pager user decides not to, or is otherwise unable to respond, a reverse page command for a time out message is transmitted from the virtual pager back to the base station 212 of FIG. 2 at block 530. Upon receipt by base station 212, the reverse page command will be processed as described herein below in order to inform the page originator of the intended recipients unavailability.

If, on the other hand, a reverse page option is selected at block 526, in a timely fashion, flow will proceed from block 526 to block 532, where a reverse page command, corresponding to the selected option, is transmitted from the virtual pager back to base station 212 of FIG. 2. Upon receipt by base station 212, the reverse page command will be processed as described herein below in order to provide the page originator with a response as intended by the virtual pager user. From blocks 530 and 532, flow branches back to block 502 where the virtual pager monitors for a next received incoming message.

From the foregoing, it should be appreciated that a reverse page has two functions; one is to acknowledge reception of the original paging call, the other is to provide a response the page originator.

Figure 8:
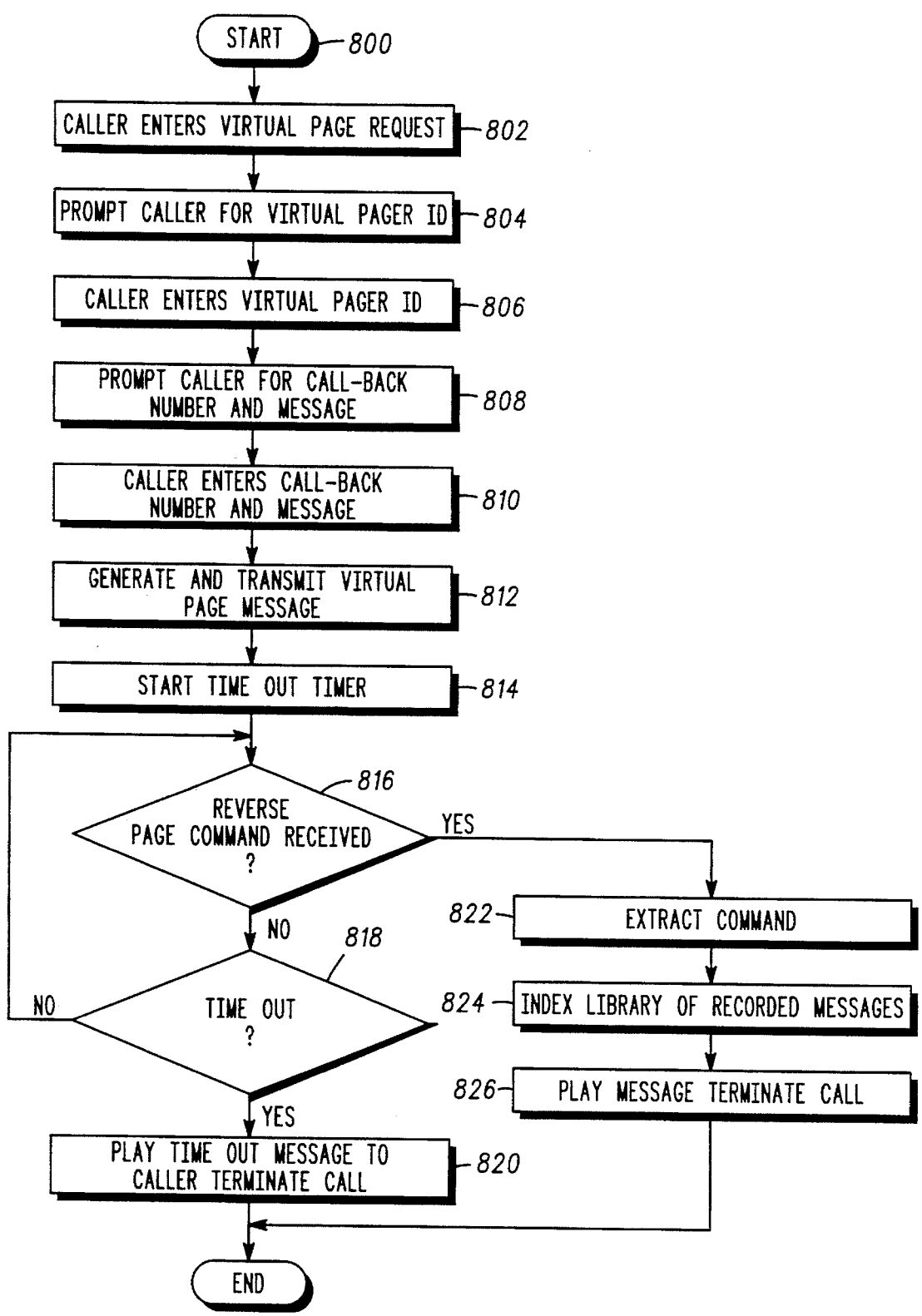
FIG. 8 is a flow chart depicting the operation of a base station in accordance with the present invention.

Referring to FIG. 8, a flow chart diagram depicting the operation of base station 212 FIG. 2 is provided. Commencing with star block 800, flow proceeds to block 802 when a caller 125, 135, 145 enters a request to page a virtual page device 242. Flow proceeds to block 804 where the base station, under direction and control of a microcomputer, programmed in accordance with the steps presented herein in accordance with FIG. 8, prompts the caller to enter an ID number (telephone number) for the virtual pager intended to receive the message. At step 806 the caller enters the appropriate ID information. At block 808, the base station then prompts the caller to enter a call-back number where the caller may be reached along with any textual message that the caller desires to have delivered along with the virtual page., At block 810 the caller, in response to the prompt, enters the call-back number and message. At block 812, the base station, armed with this information, generates the virtual page message as depicted in FIG. 3 and transmits the message to the population of virtual pagers 242.

At blocks 814 through 818 the base station awaits, for a predetermined time interval, the arrival of a reverse page command that corresponds to the virtual page transmitted at block 812. Assuming such a command is not received by the base station within the prescribed time period, the bases station at block 820 plays a recorded message to the caller (i.e., page originator) informing them of the intended recipients unavailability and thereafter terminates the call.

If on the other hand, a reverse page command message corresponding to the virtual page as transmitted at block 812 is received by the base station in a timely fashion, the base station processing resource will process the received signal to extract the reverse page command at block 822. This extracted command is then used at block 824 to index a base station data base that maintains files unique to each virtual pager subscriber within the system 200 of FIG. 2. Such files contain pre-recorded messages, as entered or caused to be entered by a virtual pager subscriber. The prerecorded messages comprise the responses a virtual pager subscriber wishes to present to a page originator. In accordance, each reverse page command received by the base station, will index a separate prerecorded message for transmission to the page originator. At block 826, the base station will cause the indexed message to be played to the page originator, prior to termination of the call.

Since the prerecorded messages are entered or caused to be entered by the virtual pager subscriber, each subscriber has the ability to customize the messages as played back to a caller (page originator). As will be appreciated, such messages may include, but are by no means limited to responses such as: 1) IN A MEETING; 2) AWAY ON VACATION; 3) WILL CALL YOU BACK; 4) CALL ME AT HOME; 5) WHO IS CALLING PLEASE?; CALL ME BACK LATER; 6) WILL CALL YOU BACK LATER; and 7) ON MY WAY, just to name a few.

In summary, the foregoing describes an apparatus and method for radio paging which permits a general purpose data terminal, such as a personal computer, portable computer, personal intelligent communicator, portable wireless terminal and the like to operate as an Ack-back pager.

What is claimed is:

1. A data communication system comprising:

a base station for transmitting variable length message signals to a plurality of remotely located data terminals, said base station including: input means for receiving variable length message signals to be sent to said plurality of data terminals, and a transmitter, coupled to said input means, for transmitting the variable length messages to said plurality of data terminals, said variable length messages comprising at least one of a call-back number and message text; and said plurality of data terminals, each comprising: a receiver for receiving the variable length messages, means, coupled to the receiver, for selecting a variable length message as intended for a particular data terminal among the plurality of remotely located data terminals, means for storing a table of caller identification information in memory, said caller identification information comprising at least one of a caller ID number and a catchword, means, coupled to the selecting means for extracting the call-back number from the selected message, means, coupled to memory and the selecting means, for comparing the received call-back number to caller ID numbers stored in memory, and means for displaying the selected message and the caller identification information stored in memory as a function of the comparison.

2. The data communication system of claim 1 wherein a data terminal is a device selected from the group consisting of:

general purpose computers, personal computers, portable computers, notebook computers, electronic personal organizers and intelligent personal communicators.

3. The data communication system of claim 1 wherein a data terminal further comprises means, coupled to the selecting means for comparing the received message text to stored catchwords when a call-back number is not present, and means for displaying the selected message and the caller identification information stored in memory as a function of the comparison.

4. A general purpose data terminal for receiving a radio paging call comprising a caller generated variable length message, said message comprising at least one of a call-back number and message text, said general purpose data terminal comprising:

a radio receiver for receiving the caller generated variable length message;

memory for storing a table of caller identification information, said information comprising at least one of a plurality of caller ID numbers and a plurality of catchwords;

processing means, coupled to the radio receiver, for extracting the call-back number from the received message;

said processing means, coupled to the memory, for indexing the table as a function of the extracted call-back number;

a display unit, coupled to memory, for displaying the received message and the indexed caller identification information;

an input device, operative by a data terminal user, for designating a user selected response in response to the message display; and a radio transmitter, responsive to the user designation, for transmitting a signal acknowledging reception of said paging call, said acknowledge signal also being indicative of a response to said paging call.

5. The general purpose data terminal of claim 4 is a device selected from the group consisting of:

personal computers, portable computers, notebook computers, electronic personal organizers, intelligent personal communicators and portable wireless terminals.

6. The general purpose data terminal of claim 4 wherein the displaying unit is a visual display device selected from the group consisting of:

cathode ray tube (CRT) monitors, television monitors, liquid crystal display (LCD) modules, and light emitting diode (LED) displays.

7. The general purpose data terminal of claim 4 wherein the input device for designating a user selected response is a device selected from the group consisting of:

touch screen apparatus, electromechanical switches, alphanumeric keyboards, light sensitive pens, voice activation devices, graphic user interfaces, and computerized information presentation systems.

8. The general purpose data terminal of claim 4 further comprising said processing means, coupled to the radio receiver and memory, for comparing the received message text to catchwords stored in memory when a call-back number is not present and for indexing the table based upon a catchword comparison, said display unit, coupled to memory, for displaying the received message and the caller identification information stored in memory as a function of the comparison.

9. The general purpose data terminal of claim 4 wherein the key words are selected from the group consisting of: first names, surnames, business names, addresses and names for interpersonal relationships.

10. In a data communication system a method of radio paging comprising the steps of:

transmitting a paging call comprising a caller generated variable length message, said message comprising at least one of a call-back number and message text;

receiving at a general purpose computer, having a radio receiver, the caller generated variable length message;

storing within general purpose computer memory, a table of caller identification information, said caller identification information comprising at least one of callback numbers and catchwords;

extracting the call-back number from the received message;

indexing the table as a function of the extracted call-back number;

displaying the received message and the indexed caller identification information;

in response to the display of said message and the caller identification information, designating a user selected response; and in response to the user designation, transmitting a signal acknowledging reception of said paging call, said acknowledge signal also being indicative of a response to the transmitted paging call.

11. A data communication system comprising:

a base station for transmitting variable length message signals to a plurality of remotely located data terminals, said base station including: input means for receiving variable length message signals from a message originator to be sent to said plurality of data terminals, said variable length messages comprising at least one of a call-back number and message text, a transmitter, coupled to said input means, for transmitting the variable length messages to said plurality of data terminals, a receiver for receiving messages from said plurality of data terminals in response to the transmitted message, and means, coupled to the receiver for routing signals back to said originator, said signals providing indicia of reception of the transmitted signal as well as a response to the originator; and said plurality of data terminals, each comprising: a receiver for receiving the variable length messages, means, coupled to the receiver, for selecting a variable length message as intended for a particular data terminal among the plurality, means for storing a table of caller identification information in memory, said caller identification information comprising at least one of a call-back number and a catchword, means, coupled to the selecting means for extracting the call-back number from the selected message, means, coupled to memory and the selecting means, for comparing the received call-back number to call-back numbers stored in memory, and means for displaying the selected message and the caller identification information stored in memory as a function of the comparison.

12. The system of claim 11 wherein a data terminal further comprises:

an input device, operative by a data terminal user, for designating a user selected response in response to the message display; and a radio transmitter, responsive to the user designation, for transmitting a signal back to the base station, said signal providing indicia of reception of the transmitted signal as well as a response to the originator.

* * * * *